United States Patent [19]
Piccioli et al.

[11] 3,923,937
[45] Dec. 2, 1975

[54] METHOD OF CENTRIFUGALLY CASTING PLURAL LAYERED CYLINDERS AND FORMING LONGITUDINALLY SPACED ANNULAR REINFORCEMENTS AND HELICAL REINFORCEMENTS THEREIN

[75] Inventors: Dino Piccioli; Christian Schmid, both of Milan, Italy

[73] Assignee: Soffra Etablissement, Liechtenstein

[22] Filed: Aug. 29, 1973

[21] Appl. No.: 392,553

[30] Foreign Application Priority Data
Sept. 13, 1972  Italy ................................. 29127/72

[52] U.S. Cl. ............. 264/45.7; 264/46.4; 264/46.6; 264/46.9; 264/139; 264/154; 264/254; 264/255
[51] Int. Cl.² ..... B29C 5/04; B32B 3/10; B32B 3/26
[58] Field of Search ........ 264/45.7, 46.4, 46.9, 139, 264/255, 254, 311, 154, 274

[56] References Cited
UNITED STATES PATENTS

| | | |
|---|---|---|
| 2,999,780 | 9/1961 | Perrault ............................. 264/311 |
| 3,194,274 | 7/1965 | Griffiths et al ...................... 138/140 |
| 3,455,483 | 7/1969 | Inklaar ................................. 264/54 |
| 3,548,884 | 12/1970 | Ambrose ............................. 138/178 |
| R25,587 | 6/1964 | Wiltshire .............................. 264/311 |

*Primary Examiner*—Robert F. White
*Assistant Examiner*—Willard E. Hoag
*Attorney, Agent, or Firm*—Stevens, Davis, Miller & Mosher

[57] ABSTRACT

A process for obtaining hollow cylindrical bodies having a supporting structure of reinforced thermosetting resin, using a mould having a horizontal axis and kept rotating at a speed which creates a centrifugal acceleration greater than the acceleration due to gravity. A foamed layer is formed and then grooved. Reinforced resin is deposited in the grooves to form an article with axially spaced, molded reinforcing rings.

7 Claims, 3 Drawing Figures

METHOD OF CENTRIFUGALLY CASTING PLURAL LAYERED CYLINDERS AND FORMING LONGITUDINALLY SPACED ANNULAR REINFORCEMENTS AND HELICAL REINFORCEMENTS THEREIN

This invention relates to a process for obtaining hollow cylindrical bodies having a supporting structure of reinforced thermosetting resin.

More particularly this invention relates to a process for obtaining by centrifugation hollow cylindrical bodies of the aforementioned type of medium and large diameters, for example from 300 to 3000 mm and beyond, and to hollow cylindrical bodies so obtained. Processes are already known for constructing reinforced resin pipes by centrifugation, which use a rotating hollow mould into which the resin and reinforcement material are fed by means of feed devices movable longitudinally to said mould. Thus for example the U.S. Pat. No. 2,773,287 describes a process which consists of introducing a fibreglass mat into a rotating hollow mould and then depositing a thermosetting resin on the mat layer together with a dense granular material similar to sand.

According to the process of the U.S. Pat. No. 3,012,922, glass filaments, possibly rendered compact by means of a synthetic binder, are introduced into a rotating mould, the filaments are cut so forming a first layer of fibres, the synthetic binder which impregnates said fibres is possibly dissolved or softened, the chosen resin is sprayed on and lastly said resin incorporating the cut fibres are polymerized or hardened. The U.S. Pat. No. 3,150,219 describes a process in which an enveloping layer of resin in the fluid state is first obtained inside the rotating mould and the reinforcing fibre is then introduced; this latter is chosen so that its specific gravity is greater than the specific gravity of the resin, because of which the effect of the centrifugal force makes the reinforcement penetrate into the fluid layer of resin so becoming incorporated with it; after polymerization of the resins, the mould is removed from the pipe obtained.

With the aforementioned processes and other similar ones, pipes are obtained formed from a single layer (laminate) of reinforced thermosetting resin.

Other processes of the known art relate to the obtaining, again in a rotating mould, of pipes having a structure of the sandwich type, generally in three or more layers, of which the outer and inner layers are of reinforced resins and the intermediate layer, of variable thickness, consists of an inorganic agglomerate filling material with a resinous binder. Processes of this type are described, for example, in the Swiss Pat. No. 506,740 and in the Austrian Pat. No. 287,419.

The pipes obtained by processes according to the known art, because of the low value of their stiffness coefficient, which is typical of reinforced resin laminates, and of the cost of construction of these laminates which increases considerably for small increases in thickness, are very limited in their field of application. In fact when said pipes need to be of diameters greater than approximately 400–500 mm and/or when the erection conditions correspond in practice to those adopted for items made from traditional material, such as steel, reinforced concrete, prestressed concrete, fibre cement etc., the thickness of the layers of reinforced resins of which they are composed must be such that their construction is economically unacceptable.

This economically negative aspect is enchanced when large diameter underground pipes are considered, which have to support considerable oversized loads due to the ground and to accidental loads, besides external hydrostatic pressures, concentrated thrusts etc. Known processes allow small diameter pipes to be obtained which are acceptable economically only for limited erection conditions (level of the water bed not higher than the lower surface of the pipe, selected embankment materials, flexible supports and the like).

The economical disadvantage of reinforced resin pipes of the known art assumes for the aforementioned applications such a considerable aspect that pipes constructed from traditional materials are still preferred.

On the other hand the undoubted merits and advantages which plastics articles have in comparison to those of traditional material have made it a compelling necessity in this field to overcome the aforementioned problem. The main object of this invention is to provide a process which enables hollow cylindrical bodies of reinforced resin to be obtained economically, of medium and large diameters and advantageously usable in those fields of application where at the present time items of traditional material are pratically exclusively used.

A further object of this invention is to provide a process for obtaining, by centrifugation of the materials, hollow cylindrical bodies which may be directly used for constructing horizontal underground tanks, vertical tanks, silos and other similar items; or may be used indirectly for constructing composite supporting structures such as roofs for buildings, motorways, prefabricated houses, silos and tanks of large diameter, by coupling cylindrical sections suitably formed from the cylindrical bodies; the process also enables very precise manufacturing operations to be carried out, with minimum tolerances and with practically total utilization of the intrinsic mechanical properties of the materials used. These and still further objects are attained by a process for obtaining hollow cylindrical bodies having a supporting structure of reinforced thermosetting resin, using a mould having a horizontal axis and kept rotating at a speed which creates a centrifugal acceleration greater than the acceleration due to gravity, said process comprising the following stages:

a. feeding into said mould, and with progression in the axial direction, a resin and simultaneously a reinforcing and/or filling material with the formation of at least a first cylindrical wall coaxial with said mould and which will constitute the outer wall of the final hollow cylindrical body;

b. allowing the polymerization of said resin to progress in the rotating mould;

c. feeding into said mould, and with progression in the axial direction, a resin which expands and which binds to said first wall, with the formation of a layer of substantially constant thickness;

d. forming, in said layer of expanded resinous material, circumferential grooves through substantially the entire thickness of said layer, so as to expose the inner surface of said first wall;

e. giving said grooves a cross section substantially of isosceles trapezium form with its major base emerging at the inner surface of said layer;

f. uniformly filling said grooves with a thermosetting resin additive-added in a known manner for improving its mechanical properties;

g. feeding into said mould, and progressively in the axial direction, a resin and simultaneously a reinforcing and/or filling material with the formation of at least a second cylindrical wall coaxial to said mould, bonded to said layer and bonded to said first wall by the resinous additive-added material which fills said circumferential grooves, said second wall constituting the inner supporting wall of the final hollow cylindrical body, and, after having allowed the polymerization to progress in the rotating mould;

h. halting said mould and extracting the hollow cylindrical body so obtained.

According to the present invention, a hollow cylindrical body is provided characterized in that its shell, proceeding from the outside towards the inside of the hollow cylindrical body, comprises:

an outer supporting wall, an inner supporting wall, a layer of additive-added expanded resin between said supporting walls, a plurality of ribs extending circumferentially in said layer of expanded resin and connecting said outer wall to said inner wall with the formation of a supporting structure, at least said outer supporting wall consisting of a first layer of reinforced thermosetting resin and a sublayer of resin with the addition of inert materials, or a support for said first layer.

Further characteristics and advantages of the invention will be more evident from the detailed description of a preferred embodiment of the process according to the present invention, given hereinafter by way of non-limiting example with reference to the accompanying drawings in which.

Figure 1:
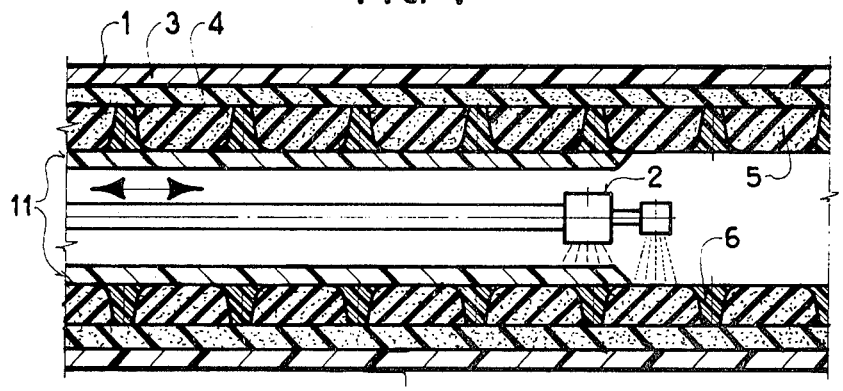
FIG. 1 shows the process according to the invention in one of its stages and, diagrammatically, the apparatus used.

To carry out the process according to this invention a mould is provided, diagrammatically indicated by the reference numeral 1, having a horizontal axis and rotating at a speed such as to create a centrifugal acceleration greater than 1 g. In this manner, all the materials fed to the inside of the mould by fed devices diagrammatically indicated by the reference numeral 2 and moving axially and longitudinally to the mould, become distributed in cylindrical layers coaxial to the mould and to each other. The first state of the process comprises uniformly feeding to the inside of said rotating mould a therosetting resin and simultaneously reinforcing fibres, for example glass fibers, with the formation of a layer 3. This thermosetting resin, for example a polyester resin, which may have undergone a precuring operation, is fed to the inside of the rotating mould by pouring whereas the reinforcing material (glass fibre), of one or a number of lengths, is deposited by dropping. The proportion of resin to reinforcing fibres varies according to the mechanical properties which are to be obtained for the layer being formed; it has however been found that satisfactory results are obtained when the quantity of reinforcing fibre varies from 20 to 50% by weight of the weight of the layer, where the length of the fibres varies from 3 to 25 cm or more. To obtain good uniformity in said layer, the desired thickness is obtained advantageously by means of a number of passes. As soon as the polymerization stage of the layer 3 has progressed sufficiently, a thermosetting resin similar or equal to the previous one, possibly subjected to precuring, and an inert material are fed uniformly into the rotating mould by pouring, to form a layer 4, called here the "support layer" or "support" for the layer 3. The inert material and the resin or one of its components, in the liquid o solid state, may be premixed, or may be combined with each other at the moment of their feeding by pouring or by gravity into the rotating mould 1; in this latter case the resin or one of its components could also be fed in finely divided form by spray nozzles.

The inert material may be an organic material of low density but of good mechanical strength, such as pumice or expanded earths (clays, vulcanic earths, shale etc.), expanded glass etc. or it may be a non-expanded material of greater density, such as sand, lapillo etc.

The particle size of the inert material used may vary widely, but obviously the maximum dimensions of the individual granules must be considerably less than the thickness of the layer 4 being formed.

The percentages of the components of the layer 4 being formed may vary widely according to the type of inert material used and the mechanical properties which are required for said layer; for example using expanded inert materials with a closed cell structure or non-porous organic materials, the component percentages advantageously lie within the following ranges: from 1 to 15% or more for the resin, and from 99 to 85% or less for the inert material.

As soon as the first polymerization stage has sufficiently progressed, a resin (for example polyester, polurethane and the like, preferably polyurethane) is fed into the rotating mould 1 uniformly by pouring or spraying, and expands to form a layer 5 of uniform thickness which binds strongly to the inner wall of the layer 4.

Although the centrifugation action developed by the rotating mould 1 is such that the layer of expanded resin (for example polyurethane) becomes distributed very uniformly inside the mould, at this point the surface of this layer may need to be ground.

This next stage of the process according to this invention comprises the formation of circumferential grooves in the layer 5 of expanded material, which pass through the entire thickness of the layer.

According to a first embodiment, in the layer 5 of expanded material a continuous helical groove 6 is formed, of predetermined pitch, obtained by a suitable tool. According to a second embodiment, a plurality of annular parallel grooves 6a is formed in the layer 5, these grooves having the same cross section and being regularly spaced apart by a length, for example, corresponding to the pitch of the previously stated helical groove. According to a characteristic of the process of this invention, the previously described grooving has a cross section essentially of isosceles trapezium form, the major base of which faces towards the inside of the pipe being formed, i.e., it emerges at the inner wall of the layer of expanded material 5.

Particular care must be taken to remove all the expanded resinous material from the groove as it is made, so that the minor base of the trapezium cross section of this groove consists of the clean inner wall of the support layer 4.

Then the grooving 6 or 6a (helical or preferably parallel rings) is uniformly filled with an additive-added thermosetting resin (possibly subjected to precuring), similarly or the same as that used for the previous layers.

For particular application requirements, cut or continuous reinforcing fibres or metal filaments or a combination of these latter may be fed simultaneously with the additive-added thermosetting resin fed by pouring into the grooves. Particular care must be used in inserting the continuous fibres or metal filaments into said grooves; for this purpose the continuous fibres or metal filaments must be fed at a relative speed between the contact surface in the grooves and said reinforcing materials of zero; this can be obtained for example by leaving a loop in the feed of the continuous reinforcing materials and applying a controlled brake slightly upstream of the point of contact between said reinforcing materials and the groove surface.

The length of the loop is controlled automatically.

To improve the structural characteristics of the cylindrical body and facilitate the introduction of thermosetting resin into said grooves, these latter comprise an enlarged radius zone 10 on edge position on the side of their major base. Any excess material fed into the grooves is conveniently contained in the enlargement defined by these radii 10.

The thermosetting resin possibly reinforced with fibres, which fills said grooves, is strongly bonded to the inner lateral surface of the support layer 4, at the minor base of the trapezoidal section of said grooves which is still in the polymerization stage.

After filling the grooves, a thermosetting resin is uniformly fed to the inside of the rotating mould simultaneously with a filling material to obtain a layer 11, qualitatively analogous to the aforementioned layer 4. This layer 11 constitutes the support layer for a more internal layer 12 which is obtained in a similar manner and with similar materials as those used for the layer 3 heretofore described. Lastly a layer 13 uniformly covering the inner wall of the layer 12 is formed.

Figure 2:
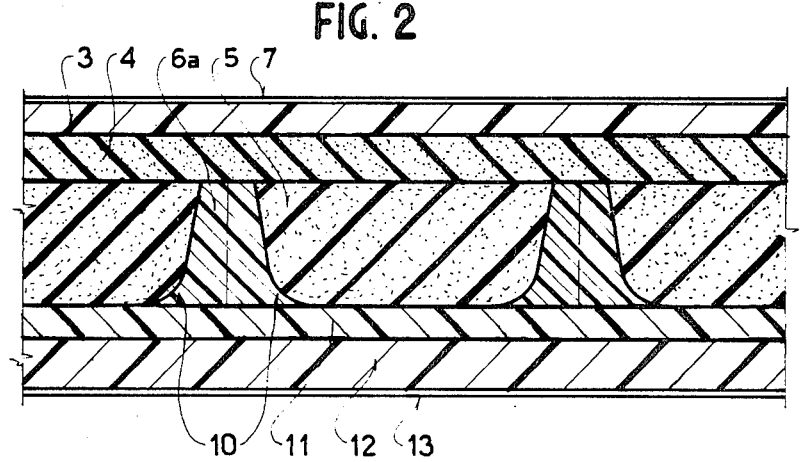
FIG. 2 is a sectional view of a portion of the shell of a cylindrical body obtained by the process according to the invention, to an enlarged scale.

When this latter layer 13 has been produced, the mould 1 remains rotating until the polymerization of the resins which constitute the layers 11, 12 and 13 has progressed to such an extent as to enable the finished pipe to be extracted. For this extraction it is not normally necessary to use materials on the outside of the layer 3 which aid the separation or to construct the mould 1 in a number of separable pieces, because of the shrinkage of vitreous resin laminates following the polymerization process. FIG. 2 shows in section to an enlarged scale the structure of a length of pipe obtained by the process heretofore described. This structure, which is particularly suitable for pipes of medium diameter (300 to 1000 mm approximately) comprises a first strong basic wall, or outer wall, consisting of a first strong layer 3 of thermosetting resin reinforced with cut fibres, and possibly, to increase the modulus of elasticity, with continuous fibres wound in the form of a helix of very low pitch.

The thickness of the layer 3, for diameters in the aforementioned range and for low nominal working pressures, is normally less than approximately 2–3 mm.

This layer 3 may be externally covered by a lining (gel coat) indicated diagrammatically at 7.

Said strong outer wall comprises a second layer 4 (support layer for the layer 3) consisting of a thermosetting resin (possibly subjected to precuring) and inert inorganic material which gives said layer excellent mechanical strength. This layer 4 has a substantially constant composition in the radial direction along a plane passing through the axis of the pipe and must preferably have a modulus of elasticity lower than that of the layer 3. The thickness of the layer 4 is determined in the following manner:

Thickness of the layer (4) equals approximately 3–4 mm - thickness of the layer (1)

The pipe comprises a second basic wall or inner strong wall consisting of the most internal layer 12 and its support layer 11 which are analogous respectively with the layers 3 and 4 previously described. The thickness of the layer 12 is less than 2–3 mm for pipe diameters of about 1000 mm and for low nominal working pressures. The thickness of the support layer 11 is determined in a similar manner to that indicated for the thickness of the layer 4. Obviously the layers 11 and 12 can have different compositions, percentages and thicknesses than the corresponding layers 3 and 4. The presence of the support layers 4 and 11 guarantees the resistance of the layer 3 to concentrated stresses such as the putching effect due to resting on stones, hoisting and erection equipment etc. and the resistance of the layers 3 and 12 to manipulation, erection operations and the like. The two basic outer and inner walls are spaced from each other by the intermediate layer 5 of low density expanded material, preferably an expanded thermosetting resin of the polyester or polyurethane type, the thickness of which is determined by the design calculation.

The intimate connection between the two basic outer and inner strong walls, which thus constitute a structural complex, is assured by the vertical walls or ribs formed by the additive-added thermosetting resin which fills the helical or parallel ring grooving formed in the intermediate layer 5. The thickness of these walls, their distance apart and the pitch of the helix or constant distance between one ring and another are determined by the design calculation. In relation to these inner vertical walls, the following three types of material used for their construction must be distinguished.

a. production of pipes not under pressure: in this case the inner vertical walls do not have a reinforcing function and must instead ensure the connection of the inner strong wall to the outer strong wall; thus it is sufficient for the inner vertical walls to consist only of thermosetting resin possibly subjected to precuring, with the addition of additives for improving its mechanical properties. This operation can take place by injection or simple pouring into the grooves obtained by milling the intermediate layer of expanded resins 5. The grooves may be of large width, for example 1, 2 or more cm.

In this case the grooves may be filled with chopped fibres (2–3 cm approximately) directed into the grooves by suitable guides. The centrifugal action considerably favors the perfect filling of the groove with the resin containing additives or not, and the reinforcing material.

b. production of pressure pipes: in this case it is necessary to give the inner vertical walls a higher rigidity and greater radial strength.

For this purpose wires previously stiffened with resins or metal wires conveniently pretreated for bonding with the resin can be guided into the helical grooves together with the resins containing suitable additives.

In all cases and especially in the case of pressure pipes a great advantage is conferred by the presence of these vertical walls inside the intermediate layer 5 and by their configuration which opens out towards the strong inner wall of the pipe where they exert an extremely advantageous hooping effect with the reduction of any undesirable concentrated forces on said strong inner wall of the pipe close to the vertical walls.

Figure 3:
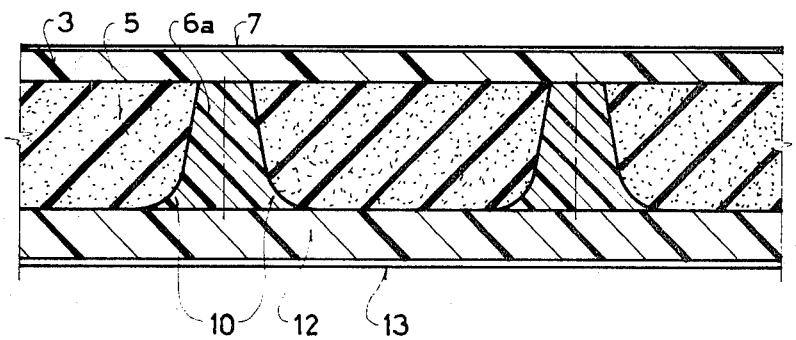
FIG. 3 is a sectional view of a portion of the shell of another cylindrical body obtained by the process according to the invention, to an enlarged scale.

When the diameter of the tube to be obtained by the process according to the invention is greater than approximately 1000 mm, the thicknesses of the outer layer 3 and/or inner layer 12 increase beyond the indicative value of 2–3 mm given heretofore. This greater consistency in the thickness of the layers is such that the dangers of fracture due to concentrated or accidental stresses practically disappears. Thus the support layers 4 and/or 11 are no longer necessary (this fact can also be deduced from the empirical formula given previously for calculating the thicknesses of said layers). FIG. 3 is a sectional view of the structure of a length of pipe having a diameter greater than 1000 mm; it can be seen that the support layers are absent.

We claim:

1. A process for obtaining a hollow cylindrical body having a support structure of reinforced thermosetting resin, using a mold having a horizontal axis and kept rotating at a speed which creates a centrifugal acceleration greater than the acceleration due to gravity, said process comprising the following stages:
   a. simultaneously feeding into said mold, and with progression in the axial direction of the mold a resin and a fibrous material and particulate fillers to form at least a first cylindrical wall coaxial with said mold and which will constitute the outer wall of a final hollow cylindrical body;
   b. polymerizing said resin in the rotating mold;
   c. feeding into said mold, and with progression in the axial direction of the mold, an expandable resinous material compatible with the resin of said first mold, and bonding same to said first wall to form a layer of substantially constant thickness;
   d. forming, in said layer of substantially constant thickness, circumferential grooves through substantially the entire thickness of said layer, so as to expose portions of the inner surface of said first wall;
   e. giving said grooves a cross section substantially of isosceles trapezium form with its major base emerging at the inner surface of said layer;
   f. uniformly filling said grooves with a fibrous material, particulate fillers and a thermosetting resin compatible with the resins of said first wall and in said layer for improving its mechanical properties;
   g. feeding into said mold, and progressively in the axial direction of said mold, a resin and simultaneously a fibrous material and particulate fillers to form at least a second cylindrical wall coaxial to said mold, bonded to said layer and bonded to said first wall by the resin, fibrous material and particulate fillers which fill said circumferential grooves, said second wall constituting an inner supporting wall of the final hollow cylindrical body, and, polymerizing said resin in said grooves, and the resin of said second wall in the rotating mold;
   h. then halting said mold and extracting the hollow cylindrical body so obtained.

2. A process as claimed in claim 1, in which said grooves are of continuous helical extension of a predetermined constant pitch.

3. A process as claimed in claim 1 in which in said layer of expanded material is formed a plurality of annular parallel grooves regularly spaced by a predetermined constant distance.

4. The process of claim 1 in which the walls of said grooves have rounded inner edge portions.

5. A process as claimed in claim 1, in which said first wall, which constitutes the outer wall of the hollow cylindrical body obtained, comprises reinforced thermosetting resin and said process further comprising forming a support layer, of resin and inert materials, for said first wall.

6. A process as claimed in claim 5 in which said first and second walls, which constitute the outer wall and inner wall of the hollow cylindrical body obtained, each comprise a reinforced thermosetting resin and said process further comprising forming support layers of resin and inert materials for said first and second walls, said support layers having a modulus of elasticity less than the modulus of elasticity of said reinforced thermosetting resin in each of said first and second walls.

7. A process for obtaining a hollow cylindrical body having a supporting structure of reinforced thermosetting resin, using a mold having a horizontal axis and kept rotating at a speed which creates a centrifugal acceleration greater than the acceleration due to gravity, said process comprising the following stages:
   a. feeding into said mold, and with progression in the axial direction of the mold, a reinforced thermosetting resin to form at least a first cylindrical wall coaxial with said mold and which will constitute the outer wall of a final hollow cylindrical body;
   b. polymerizing said resin in the rotating mold;
   c. feeding into said mold, and with progression in the axial direction of the mold, an expandible resinous material, and expanding same, said resinous material being compatible with the material of said first wall thereby binding said material to said first wall to form a layer of substantially constant thickness;
   d. forming, in said layer of substantially constant thickness, circumferential grooves through substantially the entire thickness of said layer, so as to expose of the inner surface of said first wall;
   e. giving said grooves a cross section substantially of isosceles trapezium form with its major base emerging at the inner surface of said layer;
   f. uniformly filling said grooves with a thermosetting resin compatible with the resin of said first wall and a fibrous material and particular fillers for improving its mechanical properties;
   g. feeding into said mold, and progressively in the axial direction of said mold, a reinforced thermosetting resin compatible with the resin in said grooves and in said layer to form at least a second cylindrical wall coaxial to said mold, bonded to said layer and bonded to said first wall by the resin, fibrous material and particulate fillers which fill said circumferential grooves, said second wall constituting an inner supporting wall of the final hollow cylindrical body, and polymerizing the resin in said grooves and the resin forming said second wall in the rotating mold;
   h. halting said mold and extracting the hollow cylindrical body so obtained.

* * * * *